March 8, 1932. K. KODAMA 1,848,831
TREATMENT OF CYLINDERS OF INTERNAL COMBUSTION ENGINES
Filed Nov. 2, 1929
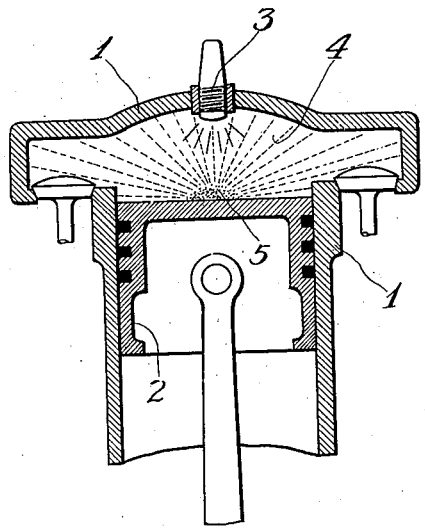

Patented Mar. 8, 1932

1,848,831

UNITED STATES PATENT OFFICE

KENTA KODAMA, OF FUKUISHI, JAPAN

TREATMENT OF CYLINDERS OF INTERNAL COMBUSTION ENGINES

Application filed November 2, 1929, Serial No. 404,470, and in Japan November 5, 1928.

This invention relates to the treatment of cylinders of internal combustion engines, and is characterized by throwing into the cylinder a mixture of either catalytic substances capable of aiding the combustion of the fuel, catalytically, when ignited, or substances capable of producing said catalytic substances by heating, such as silver nitrate, silver oxide or colloidal silver and with suitable explosives added and starting the engine by which the said substances are ignited and exploded, the decomposed products depositing so as to cover the wall surface of the combustion chamber of the cylinder. The objects are to assist catalytically a complete combustion of the fuel in the cylinder, to develop effectively the action of converting chemical energy into mechanical energy and further to increase the efficiency of the engine.

The drawing illustrates diagrammatically the state of explosion just effected in the cylinder of an internal combustion engine. In the drawing, (1) indicates the cylinder, (2) the piston, (3) the ignition plug, (4) the combustion chamber, (5) the treating composition thrown in, and the broken lines illustrate the scattered state of the decomposed products following the explosion.

In the combustion of fuel in internal combustion engines, especially in a gasoline engine, complete combustion takes place, or should take place, at the central portion of the chamber, but at places adjacent to the wall incomplete combustion takes place due to sudden cooling of the flame, bad propagation of the flame or other causes. This leads to the production of carbon particles and impairment of engine efficiency.

This invention relates to a method of treating the cylinder with a catalyzer, to increase the heat efficiency by effecting complete combustion of the fuel in the engine cylinder, and by the special action of the flame projected on the wall surfaces. The treatment comprises throwing or injecting into the cylinder a mixture of suitable explosives with either a catalyzer capable of assisting the combustion of the fuel catalytically when ignited, or with substances capable of producing such catalyzer when heated on starting the engine and by which the said substances are ignited and exploded, the force of the explosion making the decomposed products (i. e. the catalyzer) to cover the wall surface of the cylinder combustion chamber.

Some catalyzers have characteristics to assist the combustion of fuels and produce spontaneous ignition on the compression stroke more often than in the ordinary state, hence in this invention, suitable catalyzers are used to prevent such spontaneous ignition. In other words, such catalyzers as will promote the combustion of fuels only in the ignition-time should be used.

Many experiments show that silver catalyzers are effective and fit for the above mentioned conditions. For examples, silver nitrate, silver oxide or colloidal silver can be employed. Silver nitrate produces silver oxide and reduced silver by heat decomposition. Silver nitrate, silver oxide or colloidal silver can be used either separately or in mixture.

The explosive, preferable in this treatment, is one composed of potassium chlorate and carbon powder or of potassium nitrate and carbon powder. Picric acid, or nitrated cotton can be also used. But sulphur is to be avoided in the mixture when silver catalyzer is used because it produces silver sulphide.

When potassium chlorate is used as an explosive, potassium chloride will be produced as the product of the explosion, and when potassium nitrate is used potassium carbonate will be produced. The said potassium chloride or potassium carbonate has the effect of a depositing and covering medium to produce the catalyzer deposit on the wall surface of the combustion cylinder.

The cylinder-treating composition in this method is the mixture of the catalytic substances above mentioned, or substances producing the catalyzer by heat and an explosive force, and it is used in the condition of powder, or of a solid compressed to a block.

A preferable proportion of the composition may be given as follows:

| | Parts |
|---|---|
| Silver nitrate | 42 |
| Colloidal silver | 8 |
| Potassium chlorate | 40 |
| Carbon powder | 10 |

To practice this invention ½ gram of the mixture is thrown or projected into a cylinder through the igniter hole and then the engine is started as usual, then an electric spark ignites the fuel and at the same time the mixture is exploded. By this treatment the catalyzer is deposited on and thoroughly covers the wall surface of the combustion chamber of the cylinder. The flame produced when the mixture is exploded is so violent as to burn off some portion of carbon deposited in the cylinder and the unburned carbon is covered by the catalyzer.

When a cylinder has been treated by this invention the catalyzer deposited on the wall surface produces the complete combustion of fuel catalytically, and completes the propagation of flame on the wall surface and makes the action effective by changing the chemical energy into a mechanical energy, thus increasing both the heat-efficiency of the fuel and efficiency of the engine. Experiment shows that when this method has been applied to the internal combustion engine of an automobile, the consumption of fuel can be considerably lessened.

The catalytic power of the catalyzer is gradually diminished by various causes, hence it is necessary to renew its power by repeating this treatment at proper times. The mixture to be used to practice this treatment can be previously prepared for use whenever and wherever desired.

Having described the invention and set forth its merits what I claim is:—

1. The method of treating cylinders of internal combustion engines to increase fuel combustion, consisting in introducing into the cylinder an ignitable catalytic substance capable of contributing to fuel combustion, catalytically, and an explosive mixture; igniting the explosive mixture and catalytic substance and utilizing the force generated from the explosive mixture for depositing decomposed portions of the catalytic substance on the internal wall surface of the cylinder.

2. In treatment of cylinders of internal combustion engines to increase fuel combustion, the employment of a mixture of catalytic substances, and an explosive mixture, the explosive mixture serving when ignited to ignite the catalytic substances, and the force generated from the explosive mixture serving to deposit decomposed portions of the catalytic substances on the internal wall surface of the cylinder.

KENTA KODAMA.